UNITED STATES PATENT OFFICE.

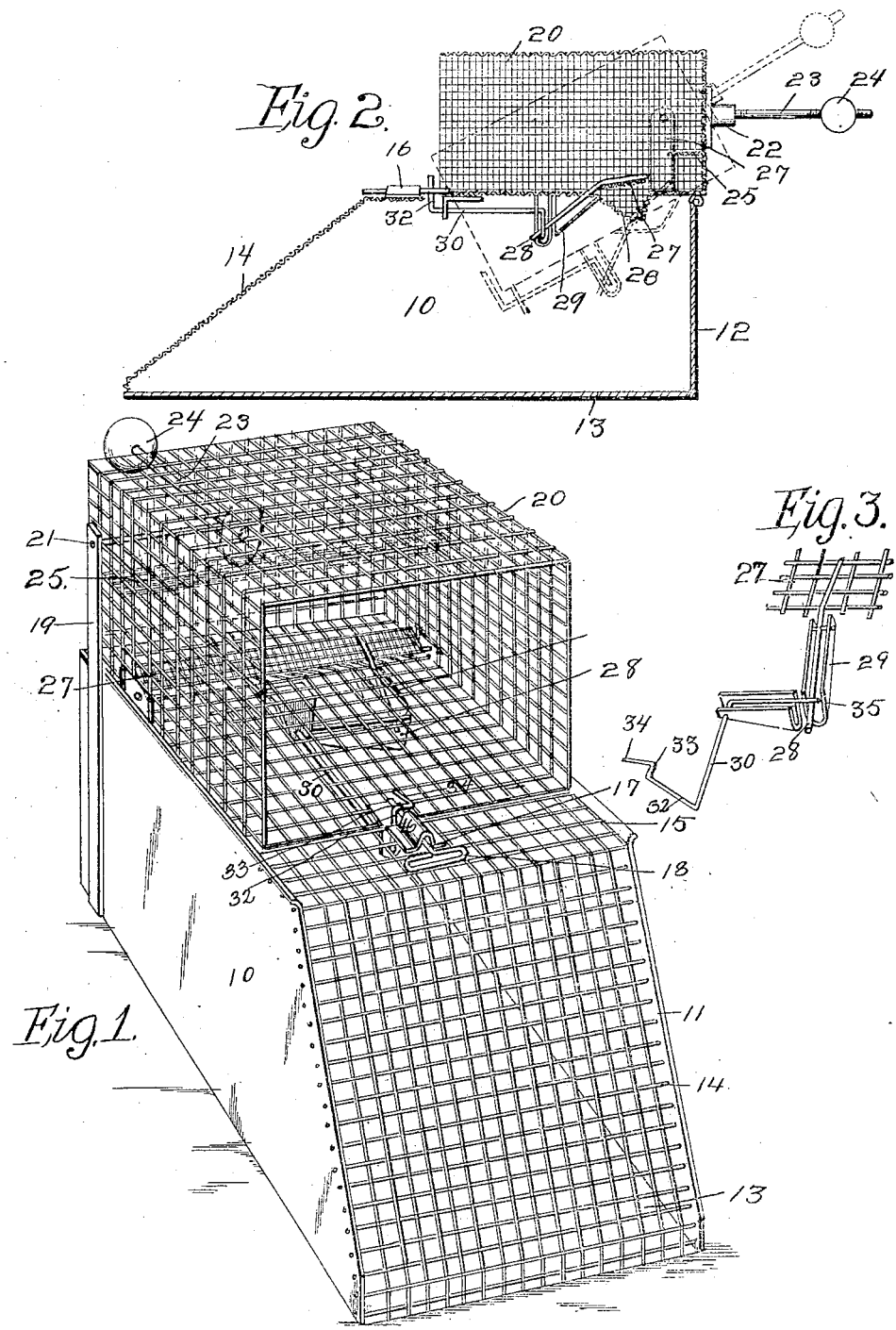

FERDINAND H. SCHULTZ, OF TREYNOR, IOWA.

TRAP.

No. 803,629.

Specification of Letters Patent.

Patented Nov. 7, 1905.

Application filed March 2, 1905. Serial No. 248,035.

*To all whom it may concern:*

Be it known that I, FERDINAND H. SCHULTZ, a citizen of the United States, residing at Treynor, in the county of Pottawattamie and State of Iowa, have invented a certain new and useful Trap, of which the following is a specification.

The objects of my invention are to provide an animal-trap of simple, durable, and inexpensive construction with which a number of animals—such as rats, mice, and other vermin—can be caught in succession and released into the lower part of the trap from the upper and then allow the upper portion of the trap to swing to its normal or locked position and to allow another animal to seek the bait in this upper portion and then be swung downwardly on the upper portion of the trap into the lower portion, thus providing a trap which will catch as many animals as the lower portion of the trap will hold.

A further object is to provide a trap which is operated solely by the weight of the animal and one which can be regulated so that the upper portion of the trap will always be kept in perfect balance, so as to allow the locking device to automatically lock as soon as the animal has been caught and delivered to the lower portion of the trap, and thus leave the trap in readiness for catching another animal.

A further object is to provide a trap which is so constructed that the animal can be easily removed from the interior of the trap after it has been caught by simply throwing a rod, which is used as a part of the locking mechanism, out and swinging the upper portion of the trap away from the lower portion.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete trap in a set position. Fig. 2 is a longitudinal sectional view of the trap, showing it in a set position and in dotted lines showing the upper portion of the trap swung to its lower limit of movement; and Fig. 3 is a detail view of a portion of the locking mechanism for securing the upper portion of the trap in a set position.

Referring to the accompanying drawings, it will be seen that I have provided a retaining-chamber which is made up of the sides 10 and 11, the rear portion 12, the bottom 13, and the inclined front portion 14, which is made of screen-wire and is the approach to the trap and is thus constructed so that the animals can easily approach it and be thus the more easily caught.

I have provided a continuation of the inclined front 14, which is between the upper forward portion of the sides 10 and 11, and have designated this by the numeral 15. Attached to the portion 15 is a collar 16, in which there is a sliding pin 17, having the handle 18 at its outer end. This sliding pin 17 is made of sufficient length so that when the handle 18 engages the collar 16 the inner portion of the pin will project some distance back of the inner edge of the portion 15 for the purposes hereinafter described.

Attached to the rear portions of each of the sides 10 and 11 is an upright 19. Pivotally mounted between these uprights 19 is a tilting chamber 20, which is supported between these uprights 19 by the rod 21, which rod extends through the uprights 19. This tilting chamber comprises two sides, a top and bottom, and a rear portion, but the front of it is left open and is adjacent to the inclined screen approach 14—that is, it is immediately behind the portion 15. All of the tilting chamber 20 is made of screen-wire, as shown clearly in the drawings. Attached to the rear portion of the tilting chamber and midway between the top and bottom of it is a screw-threaded member 22, having the rod 23 screwed into it and having the circular weight 24 screwed on its outer or free end. The portions 22, 23, and 24 are thus constructed so that they provide adjustable means for keeping the tilting chamber at the proper balance at all times. Extending across the rear portion of the tilting chamber 20 and attached to the rear portion of it and at its ends attached to the sides of the tilting chamber is the bait-shelf 25, upon which the bait used to lure the animals into the tilting chamber is placed. In the bottom of the tilting chamber and adjacent to the rear end of it there is a depression 26, made to receive the free side of the tilting platform 27 when it is at its lower limit of movement. This tilting platform 27 is pivotally mounted between the sides of the tilting chamber 20 and immediately above the depression 26, as shown clearly in Fig. 2 of the drawings. Firmly attached to the forward edge of the tilting platform is a rod 28, which is bent downwardly and extends through the bottom of the tilting chamber, so that its forward end is beneath it.

I have provided an incasing chamber 29, which surrounds the rod 28 beneath the bottom of the tilting chamber. This incasing chamber is secured to the bottom of the tilting chamber and is so arranged that the operation of the tilting platform will not be interfered with by animals in the retaining-chamber. Pivotally attached beneath the bottom of the retaining-chamber is a rod 30, which has an upwardly-extending locking member 32, having a hooked portion 33 therein and a guiding member 34 at its extreme upper end, as shown clearly in Fig. 3 of the drawings.

Extending at right angles to the rear end of the rod 30 in such a way that its free end engages the upper portion of the rod 28 is the rod 35, which is so arranged that as the free forward end of the rod 28 is raised upwardly the rod 35 will be raised upwardly, and thus cause the rod 30 to be rocked slightly, and thus throw the hooked portion 33 of the rocking portion 32 out of engagement with the pin 17, which it normally engages when in a locked position—that is, when retaining the tilting chamber against tilting movement it will be seen that on account of the way in which the pin 17 extends over the forward edge of the bottom of the tilting chamber 20 the tilting chamber will be prevented against upward movement by this pin, and the tilting chamber will be prevented from downward movement by the locking member engaging this pin, which holds it against downward movement. Thus the tilting chamber is held normally in a locked position. For the sake of convenience I have termed the rods 30 and 35 and the locking member 32 a "locking device," and the pin 17 a "retaining device."

In practical use and assuming that the weight 24 has been put to the proper adjustment to normally hold the tilting member at its upward limit of movement and that the locking device is in its normal or locked position in engagement with the pin 17, as shown in Fig. 1 of the drawings, the operator puts the trap in the desired position and then places cheese or other bait on the bait-shelf 25, and this bait is held on the shelf by its engaging the rod 21, and thus lowers the animal into the trap without causing much of the bait to be removed by the animal, and as soon as the animal steps upon the tilting platform 27 this platform swings downwardly, causes the forward end of the rod 28 to swing upwardly, and releases the locking mechanism. As soon as the locking mechanism is released the weight of the animal again comes into play in swinging the forward end of the tilting chamber into about the position shown in dotted lines in Fig. 2, where this chamber will be retained as long as the rat or other animal is upon it.

When the forward end of the tilting chamber is inclined downwardly, the open forward end of it leads into the retaining-chamber, and as this is the only egress provided the surprised animal will immediately take advantage of it by running into the retaining-chamber. As soon as the animal thus runs off the bottom of the tilting chamber the weight 24 causes it to be swung upwardly to its upper limit of movement, where it is automatically locked in the position shown in Fig. 1 of the drawings and retained for the reception of another animal, which passes up the approach 14 and into the tilting chamber, where the operation is repeated.

The retaining-chamber may be entirely made of woven wire instead of partially of metal and be supported by a frame of heavy wire rods to support the woven wire in position. This construction is somewhat lighter and of comparatively the same expense.

Having thus described my invention, what I claim, and desire to secure by Letters Patent of the United States therefor, is—

1. In a trap, a retaining-chamber, a tilting chamber in one position leading to the exterior of the retaining-chamber and in the other position leading to the interior of it, means for automatically locking the tilting chamber at its upper limit of movement, and a sliding pin forming a portion of the locking mechanism which when removed allows the tilting chamber to be tilted upwardly by the operator to remove the animals from the interior of the retaining-chamber.

2. In a trap, a retaining-chamber, a tilting chamber in one position leading to the exterior of the retaining-chamber and in the other position leading to the interior of it, means for automatically locking the tilting chamber at its upper limit of movement, means operated by the weight of an animal to swing the tilting chamber to its lower limit of movement, and a sliding pin forming a portion of the locking mechanism which when removed allows the tilting chamber to be tilted upwardly by the operator to remove the animals from the interior of the chamber.

3. In a trap, a retaining-chamber, a tilting chamber in one position leading to the exterior of the retaining-chamber and in the other position leading to the interior of it, means for automatically locking the tilting chamber at its upper limit of movement, a bait-shelf at the inner end of the tilting chamber, and a sliding pin forming a portion of the locking mechanism which when removed allows the tilting chamber to be tilted upwardly by the operator to remove the animals from the interior of the retaining-chamber.

4. A tilting chamber made of screen-wire having an open front therein, a screen approach forming the front of the retaining-chamber and leading into the tilting chamber when it is at its upper limit of movement, adjustable means for automatically swinging the trap from its lower limit of movement, means for automatically locking the tilting chamber at its upper limit of movement, means designed to be operated by the weight of an animal for releasing the locking mechanism and allowing the weight of the animal to swing the tilting chamber to its lower limit of movement and provide an egress for the animal into the retaining-chamber, and a sliding pin forming a portion of the locking mechanism which, when removed from its inner limit of movement allows the tilting chamber to be swung upwardly to provide access to the interior of the retaining-chamber.

FERDINAND H. SCHULTZ.

Witnesses:
 O. O. BUCK,
 JOHANNES DONNER.